(12) United States Patent
Caramelli et al.

(10) Patent No.: US 11,948,039 B2
(45) Date of Patent: Apr. 2, 2024

(54) MULTIPURPOSE CARD AND READING SYSTEM FOR SAID MULTIPURPOSE CARD

(71) Applicant: DIAMSAFE S.R.L., Rome (IT)

(72) Inventors: Antonio Caramelli, Rome (IT); Andrea Falcioni, Rome (IT)

(73) Assignee: DIAMSAFE S.R.L., Rome (IT)

( * ) Notice: Subject to any disclaimer, the term of this patent is extended or adjusted under 35 U.S.C. 154(b) by 0 days.

(21) Appl. No.: 17/799,176

(22) PCT Filed: Feb. 4, 2021

(86) PCT No.: PCT/IB2021/050906
§ 371 (c)(1),
(2) Date: Aug. 11, 2022

(87) PCT Pub. No.: WO2021/161137
PCT Pub. Date: Aug. 19, 2021

(65) Prior Publication Data
US 2023/0097955 A1 Mar. 30, 2023

(30) Foreign Application Priority Data
Feb. 11, 2020 (IT) .................... 102020000002647

(51) Int. Cl.
*G06K 19/08* (2006.01)
*G06K 19/18* (2006.01)

(52) U.S. Cl.
CPC .......... *G06K 19/086* (2013.01); *G06K 19/18* (2013.01)

(58) Field of Classification Search
CPC ..... G06K 19/086; G06K 19/18; G07F 7/0826
See application file for complete search history.

(56) References Cited

U.S. PATENT DOCUMENTS 4,931,629 A * 6/1990 Frankfurt ............. B42D 25/373
235/382
5,364,482 A * 11/1994 Morikawa ............... B32B 15/08
428/463

(Continued)

FOREIGN PATENT DOCUMENTS

AU 624669 B2 6/1992
FR 2981550 A1 4/2013

(Continued)

OTHER PUBLICATIONS

European Patent Office, International Search Report issued in PCT/IB2021/050906, dated May 11, 2021, Rijswijk, NL.

(Continued)

*Primary Examiner* — Thien M Le
*Assistant Examiner* — Asifa Habib
(74) *Attorney, Agent, or Firm* — Ferguson Case Orr Paterson

(57) ABSTRACT

A structure of a multipurpose card having a semi-transparent or transparent stone is provided. The stone is a faceted precious stone, such as a diamond. The diamond is illuminated from only one side of the multipurpose card and light is passed through predetermined optical paths. An image of the diamond is acquired from the opposite side of the multipurpose card and compared to predetermined reference images of the diamond, to authenticate the multipurpose card.

15 Claims, 4 Drawing Sheets

(56) References Cited

U.S. PATENT DOCUMENTS

| | | | | |
|---|---|---|---|---|
| 6,093,273 | A * | 7/2000 | Lee | B32B 38/0004 |
| | | | | 156/289 |
| 6,450,402 | B1 * | 9/2002 | Regev | G06K 19/06196 |
| | | | | 235/487 |
| 8,341,862 | B1 * | 1/2013 | Gunther | A47G 1/06 |
| | | | | 229/72 |
| 8,490,866 | B1 * | 7/2013 | Aibazov | B42D 25/00 |
| | | | | 235/487 |
| 10,133,923 | B2 * | 11/2018 | Varone | G06K 19/145 |
| 10,709,221 | B1 * | 7/2020 | Kinney | A45C 13/42 |
| 11,498,355 | B2 * | 11/2022 | Lazar | B42D 15/022 |
| 2005/0216350 | A1 * | 9/2005 | Aibazov | B42D 25/20 |
| | | | | 705/19 |
| 2006/0086802 | A1 * | 4/2006 | Tolkowsky | B42D 25/00 |
| | | | | 235/487 |
| 2007/0136085 | A1 * | 6/2007 | Wagner | G06Q 30/02 |
| | | | | 705/26.1 |
| 2009/0294543 | A1 * | 12/2009 | Varga | G06K 19/06196 |
| | | | | 235/492 |
| 2011/0192907 | A1 * | 8/2011 | Galili | G06K 19/00 |
| | | | | 235/487 |
| 2015/0081506 | A1 * | 3/2015 | Neuman | A45C 11/16 |
| | | | | 705/37 |
| 2015/0223580 | A1 * | 8/2015 | Kinney | B65B 55/20 |
| | | | | 53/445 |
| 2019/0357648 | A1 * | 11/2019 | Kinney | B42D 25/21 |

FOREIGN PATENT DOCUMENTS

| | | |
|---|---|---|
| GB | 2218044 A | 11/1989 |
| WO | 2013078484 A1 | 5/2013 |
| WO | 2015136697 A2 | 8/2015 |
| WO | 2018142360 A1 | 8/2018 |

OTHER PUBLICATIONS

European Patent Office, Written Opinion issued in PCT/IB2021/050906, dated May 11, 2021.

* cited by examiner

MULTIPURPOSE CARD AND READING SYSTEM FOR SAID MULTIPURPOSE CARD

CROSS-REFERENCE TO RELATED APPLICATIONS

This application is a National Phase Application of PCT International Application No. PCT/IB2021/050906, having an International Filing Date of Feb. 4, 2021 which claims the benefit of priority to Italian Patent Application No. 102020000002647, filed Feb. 11, 2020, each of which is hereby incorporated by reference in its entirety.

FIELD OF THE INVENTION

The present invention relates to a multipurpose card.

More in particular, the present invention relates to the structure of a multipurpose card comprising a semi-transparent or transparent stone, in particular a faceted precious stone, such as a diamond.

A multipurpose card is a card, preferably made of plastic material, which can be used for different purposes, as a function of how it was configured.

For example, said card may be used as an electronic wallet or as a credit card or as a cashier's check or as an instrument for identifying and storing personal information or as an electronic travel document or as means for accessing a predetermined area (e.g. such as a hotel room) or as a casino chip or as means for enabling the operation of an electronic device, e.g. such as a computer.

Furthermore, said multipurpose card may be provided with an integrated circuit capable of storing and managing information. Such an integrated circuit may be a memory controlled by dedicated logic, providing different types of services (e.g., access by means of a PIN), or it may be a microprocessor.

Either alternatively to or in combination with said integrated circuit, said multipurpose card may be provided with a magnetic strip and/or a QR code and/or a barcode and/or a human-readable code and/or an RFID tag, depending on the intended use of the card.

BACKGROUND ART

Several cards are currently known.

For example, cards are known which are used as credit cards or with prepaid cards or to access a specific service.

However, the cards of known types have the disadvantage that they can be "cloned", e.g. by replicating their electronic circuitry.

Consequently, it is possible to access the services offered by the original card illegally by means of an additional card which is a duplicate of the original card.

International patent application WO2015/126697 A2 describes a card in which one or more diamonds are embedded, which can communicate with a smartphone. Along with the diamonds, particles of colored material are included to form a unique figure which can be optically detected to authenticate the card. However, optical detection is difficult due to the light scattering between the diamond and other particles. Detection is thus prone to errors, e.g. because it is too dependent on lighting conditions.

Patent application GB 2218044 A describes a credit card in which one or more diamonds are housed in a fixed position, the card having an opaque bottom and a transparent top zone through which an image of the diamonds can be acquired. In contrast to the solution of the background art mentioned above, it is the diamond itself that provides the necessary uniqueness. For this very reason, the aforementioned problem of scattering and image acquisition errors is even more critical.

SUMMARY OF THE INVENTION

It is an object of the present invention to provide a multipurpose card and/or a method and/or system for reading the card which solves all or part of the problems of the background art and overcomes all or part of the drawbacks of the background art.

BRIEF DESCRIPTION OF THE FIGURES

The present invention will now be described, by way of non-limiting example, according to an embodiment thereof, with particular reference to the accompanying figures, wherein.

DETAILED DESCRIPTION

Figure 1:
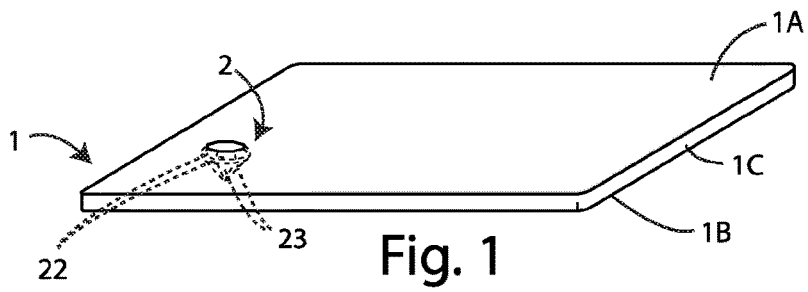
FIG. 1 is a perspective view of a first embodiment of a multipurpose card comprising a diamond, which is the object of the invention.
Figure 2:
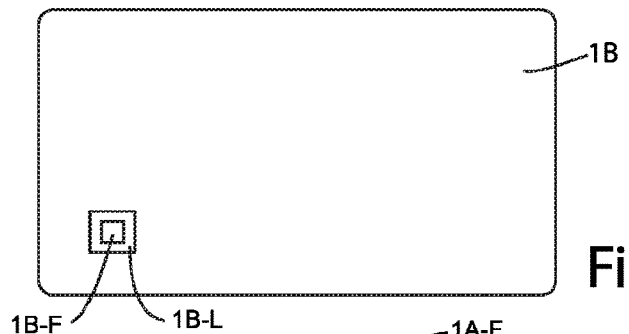
FIG. 2 is a bottom view of the multipurpose card in FIG. 1.
Figure 3:
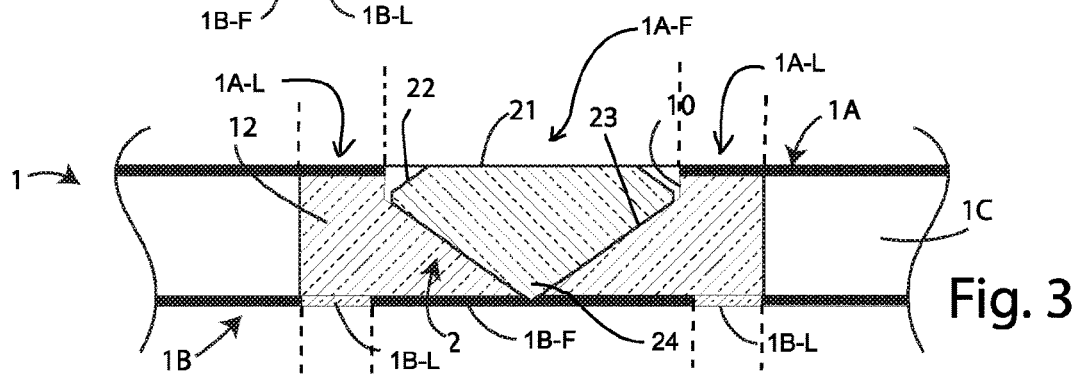
FIG. 3 is a diagrammatic cross-section view of the multipurpose card in FIG. 1.

In the embodiments described below, with reference to the accompanying figures, said stone is a diamond. However, the same card may comprise any semi-transparent or transparent stone, such as a faceted precious stone other than a diamond. The card according to the present description may have a plurality of diamonds used in the same manner as the single illustrated diamond.

Furthermore, reference will be made hereafter to light, but it must be understood that it is also valid for any other electromagnetic radiation or in general any type of radiation with the appropriate adaptations.

The Multipurpose Card

Basic Configuration in One Block

A first embodiment of a multipurpose card is described with reference to FIGS. 1-4.

Said multipurpose card may conveniently be a card made of a plastic material, e.g. ABS or polycarbonate, having a predetermined thickness, preferably comprised between 0.3 mm and 7 mm.

However, said card may be made of a material selected from the following group: plastic material, metallic material (e.g., copper), carbon fiber and resin material, fiberglass, or a combination of two or more of said materials, without thereby departing from the scope of the invention.

With reference to the length and width dimensions, said length may be about 85.60 mm and said width may be about 53.98 mm.

With reference to the diamond, it has surfaces named: table, crown, girdle, and pavilion, the latter terminating in the so-called "culet".

The multipurpose card 1 comprises a first surface 1A, a second surface 1B, arranged in front of said first surface 1A, a layer 1C, arranged between said first surface 1A and said second surface 1B, and a diamond 2 or a diamond (at least semi-transparent to electromagnetic radiation, in particular light) in a fixed position (e.g. by using an adhesive and/or by means of a plurality of retainers) and at least partially in a housing 10 at least partially in said layer 1C.

In the case of the diamond, a portion of the so-called table 21 and possibly also a portion of the so-called "crown" 22 may be outside the housing.

In any event, a portion of the table must be visible from or otherwise in contact with the exterior of the multipurpose card 1.

Advantageously, the multipurpose card may comprise a covering element of the diamond portion which protrudes from the plane of the card.

According to an aspect of the present description, in the card 1, the first surface 1A may comprise:
one or more first frontal areas 1A-F with a frontal degree of transparency, either positioned in front of or comprising portions of said diamond 2;
one or more first lateral areas 1A-L with a first lateral degree of transparency, positioned outside said one or more first frontal areas 1A-F.

According to an aspect of the present description, said first frontal degree of transparency is greater than said first lateral degree of transparency.

According to an aspect of the present description, in the card 1, the second surface 1B may comprise:
one or more second frontal areas 1B-F with a second frontal degree of transparency, positioned in front of said diamond 2;
one or more second lateral areas 1B-L with a second lateral degree of transparency, positioned outside said one or more second frontal areas 1B-F.

According to an aspect of the present description, said second frontal degree of transparency is smaller than said second lateral degree of transparency.

Areas include both zones in which the first or second surface has an opening, zones in which they are full and zones in which the diamond is encountered because it protrudes from a housing in the card. In the case of an opening in the first or second surface, the area is an ideal surface which joins the edges of each single opening.

Lateral areas outside of frontal areas mean outside a region which comprises all the frontal areas. In particular, there is only one frontal area. Again, the lateral area may be a single area which surrounds the frontal area.

In general, in the present description, said diamond 2 is arranged so that the projection of said first portion (visible from outside the multipurpose card 1) of said diamond 2 along an axis, perpendicular to said first surface 1A and said second surface 1B, falls on a portion 1B-F of said second surface 1B so that light (either wholly or in addition to ambient light) can only arrive through the second lateral portions 1B-L.

The apex 24 of said diamond 2 is preferably arranged on said area or portion 1B-F of said second surface 1B.

The aforementioned transparency refers to light (and more generally to any electromagnetic or other radiation).

The first degree of frontal transparency and the second degree of lateral transparency must be such that they allow a sufficient amount of radiation to acquire an image of the diamond, as explained below.

According to a variation of the present description, the areas 1A-L and 1B-F are made of radiation shielding material, e.g. opaque.

According to the present description, in the card 1, the layer 1C comprises, along a set of optical paths (more in general related to a radiation, e.g. electromagnetic) between said one or more second lateral areas 1B-L and at least one surface portion of said housing 10, interposed means 12 at least semi-transparent to said electromagnetic radiation, configured to allow light to pass up to said housing 10.

The mentioned various degrees of transparency may not be uniform in the corresponding parts. In this case, the comparison of the degrees of transparency is made with respect to an average transparency or with respect to a transparency which is calculated based on the individual transparencies.

The faceted diamond (or other faceted precious stone) already has sufficient clarity for the purposes of this description. In the general case of any stone, it must have a sufficiently high degree of transparency to allow the scattering figure to be recorded when illuminated by a source of electromagnetic radiation.

The interposed at least semitransparent means 12 may consist of vacuum, air, an adhesive or other materials, even one after the other or in another combination, which ensures the passage of at least a portion of radiation coming from the one or more second lateral areas, so that the radiation can then arrive in the housing, propagate through the diamond, and exit until it reaches a scattering figure reading system. In the case of optical zone radiation, the electromagnetic paths will be optical paths.

The interposed means 12 may be at least partially in contact with the surface of the diamond and/or the walls of the housing 10, i.e. in the example of the diamond, with the pavilion 23 and possibly with the crown 22.

Figure 4:
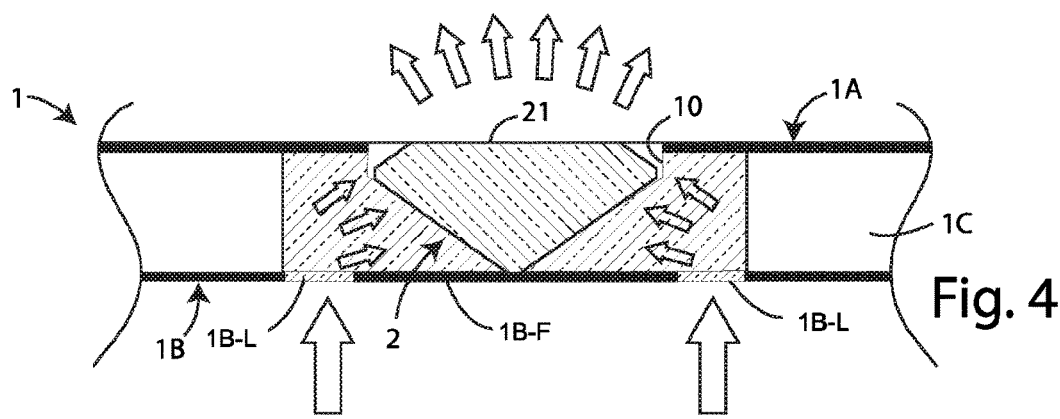
FIG. 4 shows the multipurpose card in FIG. 3 when light radiation enters into the card itself.

Referring specifically to FIG. 4, the radiation which reaches the diamond 2 enters into the diamond itself and passes through the table 21 of the diamond itself.

Figure 5:
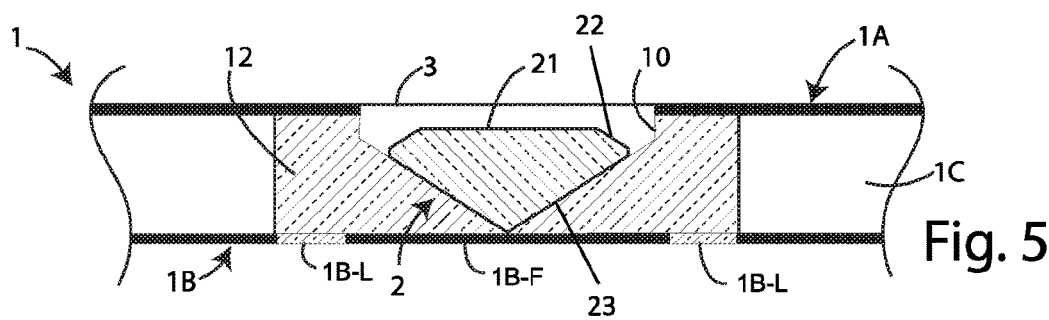
FIG. 5 is a diagrammatic view of a variant of the multipurpose card shown in FIG. 1.

Referring specifically to FIG. 5, according to a further embodiment, one or more first frontal areas 1A-F comprise at least one ideal boundary area of said housing 10 (in the figure, not shown, an ideal line which continues the surface 1A even where it is open), and wherein:

in the zone in which the diamond 2 crosses said ideal boundary area of the housing 10, the first frontal degree of transparency is the degree of transparency of the diamond 2;

in the zone in which the diamond 2 is included totally in the housing 10 (as shown in the figure), the first frontal degree of transparency is the degree of a means which is located above the diamond 2 along said first surface 1A.

The diamond 2 is arranged at least partially within said housing 10 in said multipurpose card 1, which has such walls 10B as to:

totally surround the diamond 2 and which are spaced apart from each side 22,23,25 of the diamond 2;

define at their ends a larger base 1B-F closer to said second surface 1B and a smaller base 1A-F on said first surface 1A;

said smaller base 1A-F is smaller than at least one section of the diamond 2 parallel to the smaller base and passing inside said housing 10.

The section is along the girdle if it is diamond or another precious stone. In the figures, the major base coincides with the second surface, but this is not mandatory.

In an example, the means above the diamond is air (and in this case the transparency is maximum), in a further example it is a material 3 which covers the diamond up to at least the first surface (and in this case the transparency depends on the material chosen, obviously it must be sufficiently transparent to be able to acquire an image of the diamond), in a third example, it is the diamond itself which emerges from the plane of the card and in this case the transparency is that of the diamond.

Basic Configuration Inserted Into a Larger Card

The above may be varied to construct a card in which the layer 1C also extends below the second surface 1B.

Figure 12:
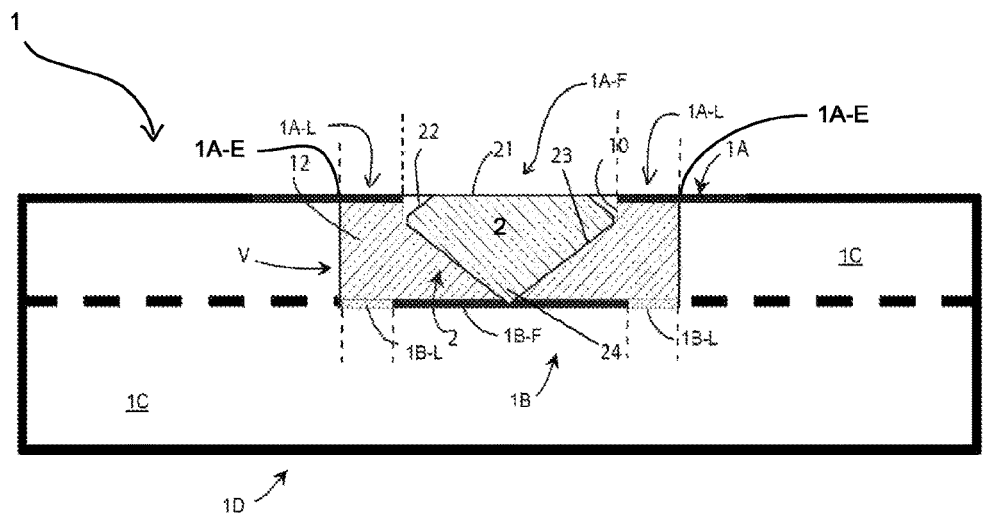
FIG. 12 shows a further embodiment of the multipurpose card according to the present description.
Figure 13:
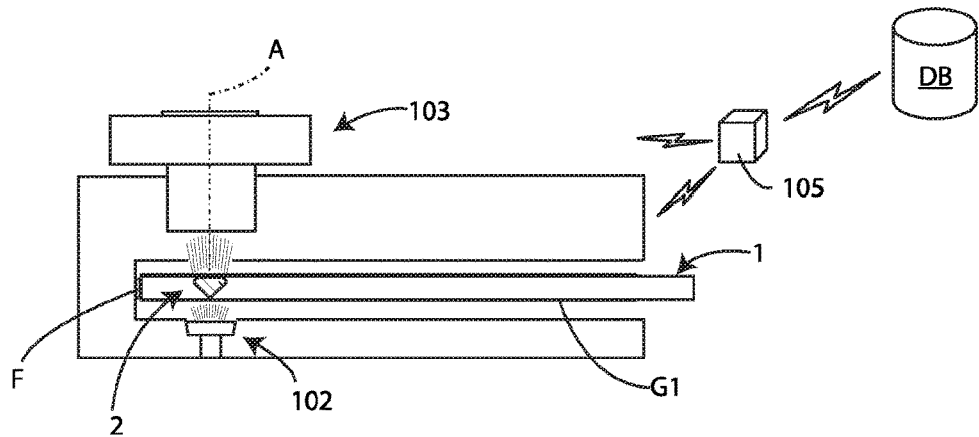
FIG. 13 shows the reading system of FIG. 9 in use when the multipurpose card in FIG. 1 is inserted into the receiving device of said reading system.

In that case, and now referring to FIG. 12, the second surface 1B is smaller than the first surface 1A.

The layer 1C extends up to a third surface 1D arranged at a distance in front of the second surface 1B on the side opposite to the first surface 1A. Furthermore, a volume V being defined in the layer 1C which:

comprises everything located between said one or more first frontal 1A-F and lateral areas 1A-L and said one or more second frontal 1B-F and lateral areas 1B-L;

has a bottom constituted at least by or facing said second surface (1B);

As specified, the multipurpose card is formed in one block or said volume V is obtained by fixing a prefabricated element in a recess of said multipurpose card 1, the outlines of which can be clearly inferred from FIG. 12. It is apparent that the second surface 1B may be part of the prefabricated piece or may be formed at the bottom of the recess. In the latter case, the bottom may be spaced apart from the second surface 1B, in said space any at least semi-transparent means may be present.

Self-Locking Configuration

Figure 5B:
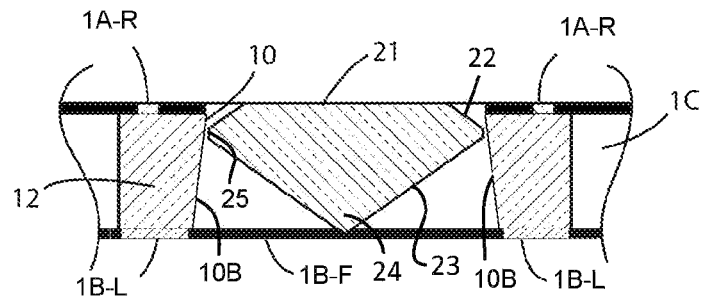
FIG. 5b is a diagrammatic view of a future variant of the multipurpose card shown in FIG. 1.

With reference to only one aspect of FIG. 5b applicable also to the other embodiments, said housing 10 may be shaped as a frustum of a cone or, more generally, to a shape including a frustum of a cone, and the part having a smaller diameter may be closer to the upper external part, to prevent the exit of the adhesive solidified in said housing and encompassing the diamond.

In such a case, the vertical walls 10B of said housing 10 are inclined so that the housing has a downward-flared section, along a vertical plane extending longitudinally. In other words, the "top" side is smaller in area than the bottom side. Such a section may conveniently be that of a frustum of a cone, or otherwise comprise a frustum of a cone, so that it does not touch the girdle 25 of the diamond 2 and thus the space between the crown 22 and the wall 10B is communicating with the space between the pavilion 23, the wall 10B and the lower surface portion 1B-F. This communication serves to make the aforesaid adhesive flow.

In this case, the insertion process of the diamond 2 takes place with the card upside down, i.e. with the first part visible from the outside resting on a surface. At this point, the diamond is inserted into the housing 10 so that the table 21 rests on said surface. The glue is poured through the space that would be occupied by the wall 1B-F until it fills all spaces, also between the supporting surface 10B and the crown 22 and the pavilion 23 of the diamond. Once the resin has hardened, the diamond 2 will no longer move due to the placement of the facets themselves. The card 1 may be turned over again and the surface portions 1B-F, 1B-L may be applied, or the machined portion may be placed within a housing in a larger card, as explained below.

Configuration with Colored Powder

In an embodiment which focuses on and isolates an aspect of FIG. 5b, said at least a portion of said housing 10 may be at a predetermined distance from at least a portion of the pavilion 23. Accordingly, a space may be present between said at least a portion of said housing 10 and said at least a portion of said pavilion 23.

In particular, a colored material powder or a mixture of colored material powders and/or a colored pigment (liquid or solid) or a mixture of colored pigments (liquid or solid) and/or a colored precious/semi-precious stone powder (e.g. such as ruby or emerald or sapphire) or a mixture of colored precious and/or semi-precious stone powders (e.g. such as a mixture of ruby powder, emerald powder, sapphire powder) may be arranged within said layer 1C, without because of this departing from the scope of the present description.

In other words, said colored material powder or said mixture of colored material powders and/or said colored pigment or said mixture of colored pigments and/or said colored precious/semi-precious stone powder or said mixture of colored precious/semi-precious stone powders may fill said layer 1C either partially or completely.

The presence of a colored material powder or a mixture of colored material powders or a colored pigment or a mixture of colored pigments or a colored material powder or a colored precious stone/semi-precious stone powder or a mixture of colored precious stone/semi-precious stone powders allows light radiation to change color before entering the diamond.

The chromatic variation of such light radiation makes it possible to obtain through image acquisition means (configured to acquire one or more images of said diamond) one or more images of the diamond with a higher chromatic content. In this manner, by means of said one or more images (obtained by means of image acquisition means) it is possible to obtain a greater amount of data so that the degree of reliability of recognition of said diamond increases.

Said colored material powder or said mixture of colored material powders and/or said colored pigment or said mixture of colored pigments and/or said colored precious/semi-precious stone powder or said mixture of colored precious/semi-precious stone powders are mixed with a further adhesive, such as a two-component epoxy resin, to occupy a fixed position with respect to said space.

Configuration with Markers

Referring to FIGS. 5b to 8, in a different aspect of the present description also applicable to the other described and/or claimed embodiments, the first surface 1A further comprises one or more first reference areas 1A-R having a first degree of reference transparency, positioned within said one or more first lateral areas 1A-L.

Advantageously, according to the present description, the first reference degree of transparency is greater than the first degree of lateral transparency.

The first reference areas are preferably arranged about said diamond to form a respective geometric figure symmetrical with respect to a central position occupied by the diamond. The geometric figure being a closed polygonal and/or symmetrical with respect to a central position occupied by the diamond.

There may be a plurality of one or more first reference areas 1A-R, also arranged in groups and also concentrically at a distance from said diamond 2. It is important for the material of said first reference areas to be chosen so that said first degree of reference transparency is sufficiently high to allow a quantity of light radiation to pass through.

The reference areas 1A-R serve as a reference for focusing a predetermined layer of the diamond 2, arranged at a predetermined distance from imaging means of a reading system configured to read said multipurpose card, as explained further below.

As explained below, once said predetermined layer is in focus, the depth of field of said imaging means can be varied to obtain an image of an inner part of the diamond comprising one or more layers adjacent to said predetermined layer.

Furthermore, each reference area 1A-R of transparent or semi-transparent material may be used to delineate the image(s) to be acquired by said imaging means so that said image(s) may be used for comparison with further images of predetermined diamonds of predetermined multipurpose cards stored in the database of said reader system.

Figure 8:
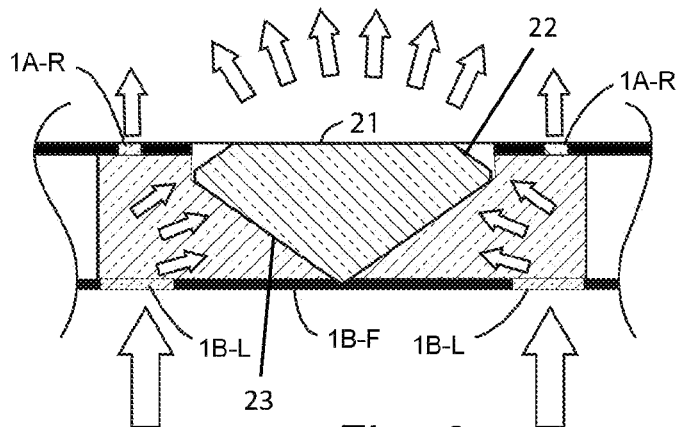
FIG. 8 shows the multipurpose card in FIG. 7 when light radiation enters into the card itself.
Figure 9:
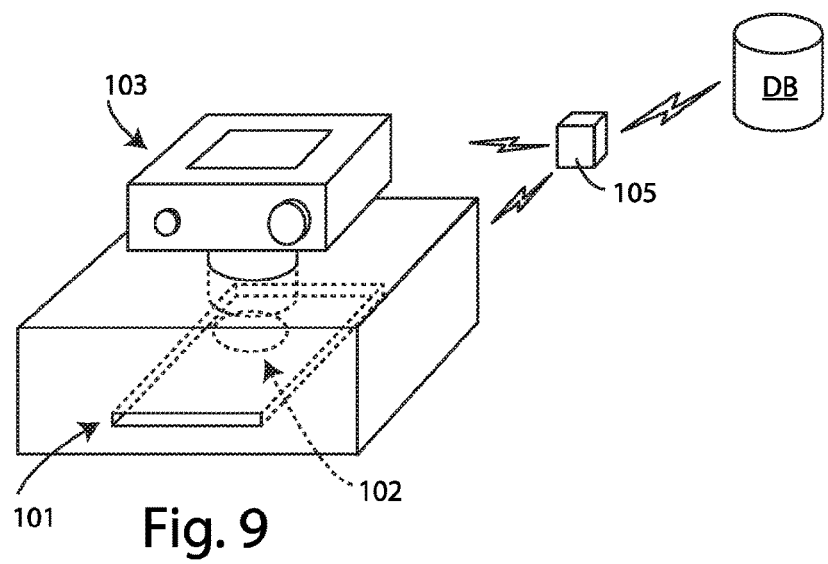
FIG. 9 shows a reading system configured to read the card in FIG. 1.

FIG. 8 shows how an amount of light radiation (e.g. produced by an artificial source or additional to natural light) which passes through the second lateral area 1B-L of the transparent or semi-transparent material and reaches the diamond 2 and the first reference lateral area 1A-L of transparent or semi-transparent material through the interposed transparent or semi-transparent material 12, which extends between walls 1A-E of the card.

The amount of light radiation which reaches the diamond 2 enters the diamond and crosses the table 21 of the diamond itself, and the amount of light radiation which reaches the first reference portion 1A-R made of transparent or semi-transparent material crosses the latter.

According to a variation of the present description, at least a portion of the first reference areas 1A-R may consist of the grooves which are normally on the surface of a chip commonly used in smartcards (e.g., credit cards), grooves which are necessary to electrically isolate the contact pads of the chip from one another. In other words, the diamond would be placed inside a chip that would act as a card processing unit. The aforesaid grooves would provide the necessary semi-transparent reference grid for the paper.

Configuration with Identification Code

According to a further aspect (not shown), applicable also to the other embodiments, at least one univocal card identification code ($CD_1$, $CD_2$ ... $CD_N$) is:

printed on said first surface 1A and/or on said second surface 1B; and/or
stored in a data storage device incorporated in said multipurpose card 1.

In a first alternative, said univocal identification code may be stored in an integrated circuit or in a magnetic strip or RFID tag.

Such an integrated circuit may be a memory controlled by dedicated logic, providing different types of services (e.g., access by means of a PIN), or it may be a microprocessor.

For example, said card may be configured to open the door of a hotel room or may be configured to be used as a credit card.

In a second alternative, said univocal identification code may be stored in a QR code or a barcode.

For example, the univocal identifier may be a sequence of symbols. For example, said sequence of symbols may be a sequence of alphanumeric symbols or a sequence of numeric symbols. However, each symbol may be a sign composed of one or more portions of a number, without because of this departing from the scope of the inventions.

Reading Method

The card above described allows an innovative reading method if at least one univocal card identifier $CD_1$, $CD_2$ ... $CD_N$ is:
printed on the first surface 1A and/or on said second surface 1B; and/or
stored in a data storage device incorporated in the multipurpose card 1.

According to the method, the following successive steps (not shown as such) are performed:
A. positioning the multipurpose card 1 in a fixed position with respect to a predetermined spatial reference system (e.g. to the reference system of the reading system, to the imagine acquisition means, etc.);
B. sending an electromagnetic radiation (e.g. light) on said one or more second lateral areas 1B-L;
C. acquiring at least one image of said diamond 2 on the basis of an electromagnetic radiation exiting from said one or more first frontal areas 1A-F;
D. comparing said at least one image with a set of reference images of said diamond 2 associated with respective pre-registered (or predetermined) multipurpose cards $CD_1$, $CD_2$ ... $CD_N$;
E. determining the degree of similarity between said at least one image and the images of said set of reference images,
F. identifying said multipurpose card 1 in said set of pre-registered multipurpose cards, based on the degree of similarity of step E.

The degree of similarity is determined to compensate, for example, for measurement errors which may afflict the reference images.

The step F of identifying may comprise the following sub-steps:
F1. identifying a reference image in said reference image set having the maximum degree of similarity with said at least one image,
F2. checking whether said maximum degree of similarity is higher than a predetermined threshold value, and in the affirmative case:
F3. identifying said multipurpose card (1) with the pre-registered multipurpose card $CD_1$, $CD_2$ ... $CD_N$ having a predetermined diamond $D_1$, $D_2$ ... $D_N$ the reference image of which has the maximum degree of similarity with said at least one image.

With particular reference to the image comparison in step D, the image comparison may be made between the image(s) of an internal part of said diamond 2, acquired by specific said image acquisition means (103, see the description of the reading system), and the further image(s) of a predetermined internal part of said predetermined diamonds $D_1, D_2 \ldots D_N$, is based on the statistical correlation between said at least one image and said at least one further image.

In this specific case, the degree of similarity is the statistical correlation coefficient between the acquired image and the further image stored in a database (DB, see below).

In an alternative, the image comparison between the image(s) of a first part of said diamond 2, and the further image(s) of a predetermined internal part of said predetermined diamonds $D_1, D_2 \ldots D_N$ may be based on pixel-to-pixel subtraction between said image(s) and said further image(s). In such an alternative, the degree of similarity is given by the number of equal pixels.

In any event, the comparison of images between said image(s) and said further image(s) for the purpose of measuring the degree of similarity may be based on any method of known or future type, without thereby departing from the scope of the invention.

With reference to said predetermined threshold value, said predetermined threshold value may be 0.5 (i.e., a value comprised between 0 and 1, where 0 means no image correlation and 1 means image identity), in the case of an image comparison based on statistical correlation, or 50%, in the case of an image comparison based on pixel-to-pixel subtraction.

Reading System

The present invention further relates to a reading system configured to read said multipurpose card, which implements the method described above.

With reference to FIGS. 9-13, the reading system 100 comprises:
- a receiving device 101 for receiving a multipurpose card 1 with the identification codes described above in the reading method;
- lighting means 102 configured to irradiate (in general irradiate with a radiation, in particular electromagnetic) said diamond 2, and arranged with respect to said receiving device 101 so that, when said multipurpose card 1 is inserted in said receiving device 101, the light is incident on said one or more second lateral areas 1B-L;
- image acquisition means 103 configured to acquire at least one image of said diamond (or other at least semitransparent stone) based on an electromagnetic radiation coming from at least one of said one or more first frontal areas 1A-F;
- a database DB in which the following data are stored:
  - one or more univocal diamond identifiers $ID_1, ID_2 \ldots ID_N$ of respective one or more predetermined diamonds $(D_1, D_2 \ldots D_N)$;
  - at least one reference diamond image for each of said respective one or more predetermined diamonds $D_1, D_2 \ldots D_N$;
  - one or more univocal card identifiers $CD_1, CD_2 \ldots CD_N$ of respective pre-registered (or predetermined) multipurpose cards 1, each associated with at least one of said one or more diamond identification codes $ID_1, ID_2 \ldots ID_N$;
- a logic control unit 105, connected to said receiving device 101, to said image acquisition means 103 and to said lighting means 102.

According to an aspect of the present description:
the receiving device 101 is configured to:
- receive said multipurpose card 1, e.g. in a fixed position with respect to said image acquisition means 103 and to said lighting means 102, and
- send a signal to said logic control unit 105, when said multipurpose card 1 is inserted in said receiving device 101, the logic control unit 105 is configured to:
- receive said signal from said receiving device 101;
- control the lighting means 102 and the image acquisition means 103 to perform steps B and C according to the method of the previous section;
- perform the steps from D to F according to the method of the previous section.

Figure 10:
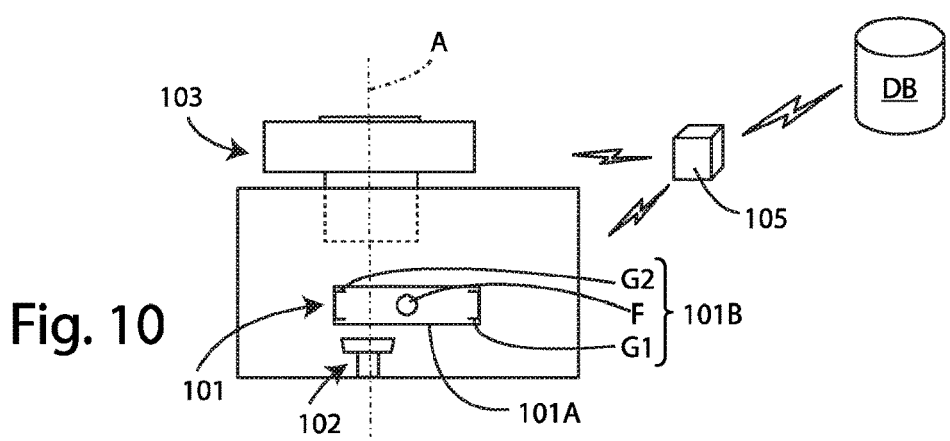
FIG. 10 is a diagrammatic front view of the system in FIG. 9.

To position the card, and with specific reference to FIG. 10, the receiving device 101 comprises insertion means 101A for inserting said multipurpose card 1 into said receiving device 101 and positioning means 101B for positioning said multipurpose card 1 in said fixed position with respect to said image acquisition means 103 and said lighting means so that, as said, an optical axis A of the system is perpendicular to said one or more internal portions $PI_1, PI_2, \ldots PI_N$ of said diamond 2 and the light radiation emitted by said lighting means reaches said second lateral portion 1B-L of transparent or semi-transparent material of the second surface 1B of said multipurpose card 1.

With particular reference to said insertion means 101A, said insertion means 101A comprise a nozzle.

With particular reference to said positioning means 101B, said positioning means 101B comprise a first "C"-shaped guiding element, indicated by G1, a second "C"-shaped guiding element, indicated by G2, each of which is arranged within the receiving device 101, respectively on a first wall and on a second wall (opposite to said first wall) of said receiving device 101, and limit stop means F, arranged on a third wall which joins said first wall and said second wall. In particular, in the embodiment described herein, said limit stop means are configured to detect the limit switch of said card and send a signal to said control logic unit (which, as mentioned above, will be described further below) when said card 1 has contacted said limit stop means F.

The lighting means may comprise at least one light source, preferably LED, or an LED matrix, and a diffuser element to diffuse the light radiation.

The reading system 100 may be configured so that:
the system 100 comprises a reader for reading said univocal identification code of said multipurpose card 1, the reader being connected to said logic control unit 105;
the logic control unit 105 is configured to:
- acquire the univocal identification code of said multipurpose card 1,
- compare codes between the univocal identification code of said multipurpose card 1 with one or more identification card codes $CD_1, CD_2 \ldots CD_N$ of respective pre-registered multipurpose cards 1 stored in said database DB,
- identify the pre-registered multipurpose card $CD_1, CD_2 \ldots CD_N$ having the univocal identification code equal to the univocal identification code of said multipurpose card 1.

In this variant, the image comparison of step D is between said at least one image, acquired by said image acquisition means 103, and one or more reference images stored in said database DB and associated with said predetermined multipurpose card $CD_1, CD_2 \ldots CD_N$ having the univocal identification code equal to the univocal identification code of said multipurpose card 1.

According to an aspect of the present description, said at least one diamond reference image comprises images of predetermined internal parts $PI_1, PI_2 \ldots PI_N$ of the diamond 2, wherein each predetermined internal part $PI_1, PI_2 \ldots PI_N$ is arranged at a respective predetermined height $h_1, h_2, \ldots H_N$ of said predetermined diamond $D_1, D_2 \ldots D_N$ along a predetermined axis. In particular, the internal parts are successive layers between the "apex" the "table", perpendicular to the predetermined optical axis, in particular perpendicular to the table. The internal parts, in turn, each comprise a respective plurality of layers $S_{11}, S_{12}, \ldots S_{1N}, S_{21}, S_{22}, \ldots S_{2N}, \ldots S_{N1}, S_{N2}, \ldots S_N$ superimposed on each other, as in FIG. 11. In this case, the image acquisition means 103 are configured to focus on a portion of a layer of said plurality of layers. Such a portion is shown with a bold segment in FIG. 11.

The number of layers of a respective internal part $PI_1, PI_2 \ldots PI_N$ (of which an image or images were acquired) depends on the depth of field of said imaging media.

Figure 11:
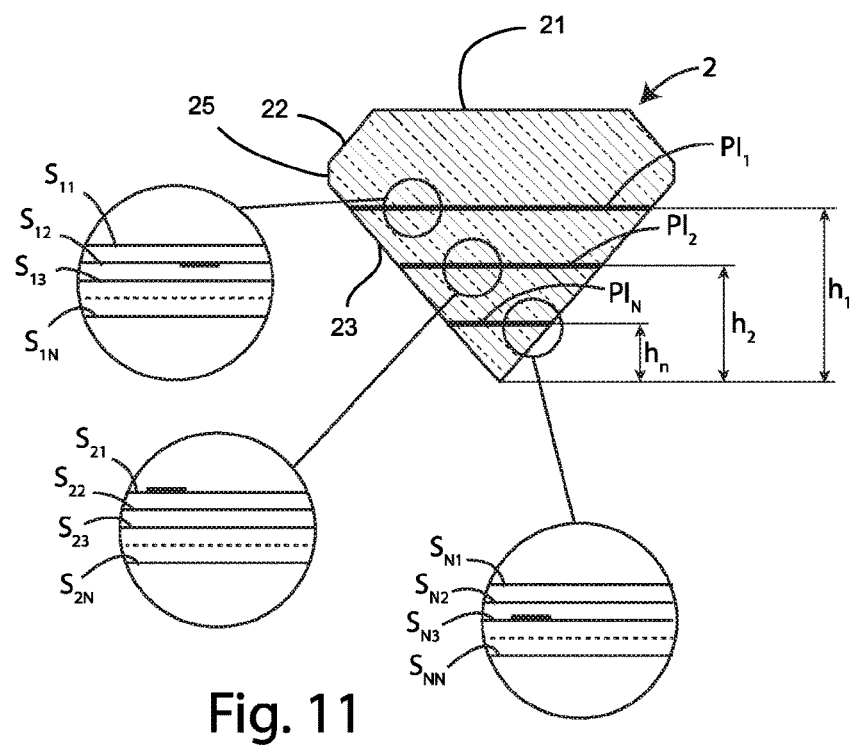
FIG. 11 shows, with reference to the diamond of the multipurpose card in FIG. 1, a plurality of internal parts, each of which is arranged at a respective height of said diamond.

With particular reference to FIG. 11, for example, with reference to a first plurality of layers $S_{11}, S_{12} \ldots S_{1N}$ referring to the first internal portion $PI_1$ a portion arranged on a second layer $S_{12}$ is focused.

With reference to a second plurality of layers $S_{21}, S_{22} \ldots S_{2N}$ referred to the second internal part $PI_2$ is focused a portion arranged on a first layer $S_{21}$.

With reference to yet another plurality of layers $S_{N1}, S_{N2} \ldots S_N$ referred to the nth internal part $PI_N$ a portion arranged on a third layer $S_{13}$ is focused.

According to an embodiment of the present invention, the image acquisition means 103 comprise:
- an optical sensor or film;
- an optical assembly comprising at least one lens assembly, wherein said at least one lens assembly is arranged at a first distance from said optical sensor or film and said optical assembly is arranged so that, when said optical assembly is in use, is at a second distance from the diamond 2, said first distance and said second distance being adjustable;
- a diaphragm with an adjustable opening between a first value and a second opening value, wherein said second value is greater than said first value.

In this case, the field depth of said image acquisition means (103) depends on said first distance from said second distance and on the opening value of said diaphragm. Furthermore, each reference image is obtained with a predetermined field depth.

Indeed, as known, with reference to said image acquisition means, which can be digital (e.g. such as a digital camera) or analog (e.g. such as an analog camera) it is possible to vary the first distance (i.e. the distance between said at least one lens group and said optical sensor or between said at least one optical group and said film), the second distance (i.e. the distance between said optical group and said diamond), as well as the aperture of the diaphragm.

Accordingly, with a first depth of field, one or more images of a first internal part $PI_1$ of the diamond 2 can be acquired, with a second depth of field, which is different from said first depth of field, one or more images of a second internal part $PI_2$ of the diamond 2 can be acquired, etc.

Furthermore, with reference to a first internal part $PI_1$, it is sufficient to vary a parameter of said first depth of field to obtain a further first depth of field to focus on any portion of any layer of a first plurality of layers $S_{11}, S_{12} \ldots S_{1N}$ belonging to said first internal portion $PI_1$.

With reference to a second internal part $PI_2$, it is sufficient to vary a parameter of said second depth of field to obtain a further second depth of field to focus on any portion of any layer of a second plurality of layers $S_{21}, S_{22} \ldots S_{2N}$ belonging to said first internal portion $PI_2$.

The same is true for the other internal parts of the diamond.

Preferably, the digital imaging means are configured to acquire one or more images of an internal portion of the diamond that is half the height of the diamond. In other words, said internal part is positioned on a plane parallel to said table, equidistant between said table and said apex.

It is further preferred that one or more images are acquired with different predetermined aperture values so as to obtain different images from each other. This is due to the three-dimensional nature of the observed diamond.

The following table shows the univocal ID code $ID_1, ID_2 \ldots ID_N$ and the images related to the internal parts $PI_{11}, PI_{12} \ldots PI_{1N}, PI_{21}, PI_{22} \ldots PI_{2N}, \ldots PI_{N1}, PI_{N2} \ldots PI_{NN}$ of each predetermined diamond $D_1, D_2 \ldots D_N$, as well as the univocal identification code of predetermined multipurpose cards $CD_1, CD_2, \ldots CD_N$, each of which is associated with a respective univocal identification code $ID_1, ID_2 \ldots ID_N$ of a predetermined diamond $D_1, D_2 \ldots D_N$.

| Diamond | Diamond univocal identifier code | Images | Multipurpose card univocal identification code |
|---|---|---|---|
| $D_1$ | $ID_1$ | $PI_{11}, PI_{12} \ldots PI_{1N}$ | $CD_1$ |
| $D_2$ | $ID_2$ | $PI_{21}, PI_{22} \ldots PI_{2N}$ | $CD_2$ |
| ... | ... | ... | ... |
| $D_N$ | $ID_N$ | $PI_{N1}, PI_{N2} \ldots PI_{NN}$ | $CD_N$ |

Figure 6:
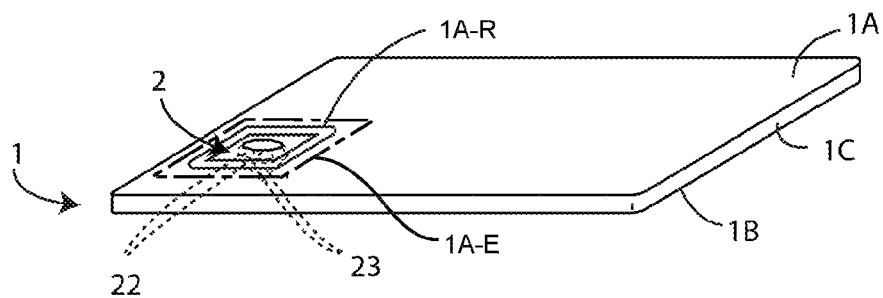
FIG. 6 is a perspective view of a second embodiment of a multipurpose card comprising a diamond object of the invention.
Figure 7:
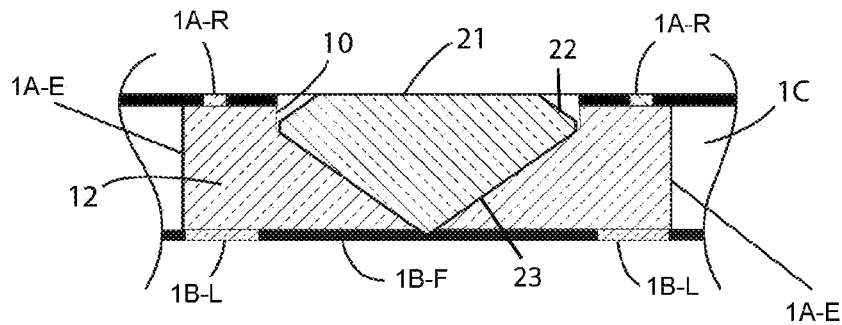
FIG. 7 is a diagrammatic cross-section view of the multipurpose card in FIG. 6.
Figure 14:
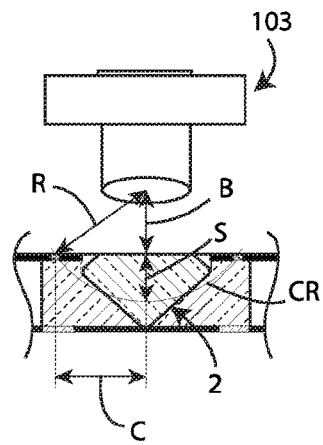
FIG. 14 is a diagrammatic view of the reading system of FIG. 9 in use when the multipurpose card in FIG. 6 is inserted into the receiving device of said reading system.

FIG. 14 is a diagrammatic view of the system, of which only said image acquisition means 103 are visible, when the second embodiment of the multipurpose card (i.e., a multipurpose card comprising at least one group of third portions of transparent or semi-transparent material and said group of third portions comprising at least one third portion of transparent or semi-transparent material), shown in FIGS. 6-8, is inserted into the receiving device of said system.

As can be seen in FIG. 14, when a multipurpose card is provided with at least one set of third portions of transparent or semi-transparent material, a predetermined layer of said diamond 2 can be focused according to the following formula:

$$S = SQRT(B^2+C^2) - B$$

wherein

S is the distance between the center of the table 21 of the diamond 2 and the center of a predetermined layer of said diamond 2, B is the distance between the center of the lens group of said image acquisition means and the center of the table 21 of the diamond 2, C is the distance between the center of the table 21 of the diamond 2 and a point of the third portion 13 of transparent or semi-transparent material in focus.

The result of the square root $SQRT$ is the radius R of a circumference CR having the center of said lens group as its center. Said radius R is also equal to the sum of the distances indicated by B and by S.

Thus, it is sufficient that the value of the radius R is subtracted from the value of the distance between the center of the lens group of said image acquisition means and the center of the diamond table, indicated by B, to obtain the value of the distance between the center of the diamond table and the center of a predetermined layer of said diamond, indicated by S.

As mentioned above, each portion 1A-R of transparent or semi-transparent material serves as a reference for focusing a predetermined layer of the diamond 2, where the distance between the center of said predetermined layer and the center of the table is obtained according to the formula above.

Accordingly, to focus a predetermined layer of a predetermined internal part of the diamond 2, it is sufficient to check that the point of the portion 1A-R of transparent or semi-transparent material the distance of which from the center of the table is indicated by C in the above formula is in focus.

Advantageously, as mentioned, the multipurpose card, object of the invention, can be used for different purposes.

The fact that the card incorporates a diamond (or any other variously faceted precious stone) makes the card not subject to cloning.

Furthermore, the reading system makes it possible to read the multipurpose card to check whether the diamond with which it is provided is a diamond stored in a database and to check whether the univocal identification code of said diamond is associated with the univocal identification code of the multipurpose card.

The present invention was described by way of non-limiting example according to a preferred embodiment thereof, but it is to be understood that variations and/or modifications may be made by the person skilled in the art without departing from the scope of protection thereof, as defined by the appended claims.

The invention claimed is:

1. A multipurpose card, comprising a first surface, a second surface, arranged in front of said first surface, a layer, arranged between said first surface and said second surface, and a stone, at least semi-transparent to an electromagnetic radiation, in a fixed position and at least partially in a housing at least partially in said layer; wherein:
   the first surface comprises:
      one or more first frontal areas with a first frontal degree of transparency to said electromagnetic radiation, either positioned in front of or comprising portions of said stone;
      one or more first lateral areas with a first lateral degree of transparency to said electromagnetic radiation, positioned outside said one or more first frontal areas;
   wherein said first frontal degree of transparency is greater than said first lateral degree of transparency;
   the second surface comprises:
      one or more second frontal areas with a second frontal degree of transparency to said electromagnetic radiation, positioned in front of said stone;
      one or more second lateral areas with a second lateral degree of transparency to said electromagnetic radiation, positioned outside said one or more second frontal areas;
   wherein said second frontal degree of transparency is smaller than said second lateral degree of transparency; and
   the layer comprises, along a set of electromagnetic paths between said one or more second lateral areas and a surface portion of said housing, interposed means at least semi-transparent to said electromagnetic radiation, configured to allow light to pass into said housing.

2. The multipurpose card of claim 1, wherein said first surface further comprises:
   one or more first reference areas made of a material with a first reference degree of transparency, positioned inside said one or more first lateral areas,
   wherein said first reference degree of transparency is greater than said first degree of lateral transparency.

3. The multipurpose card of claim 1, wherein said one or more first frontal areas comprise at least an ideal boundary area of said housing, and wherein:
   in a zone in which said stone crosses said ideal boundary area of said housing, the first frontal degree of transparency is a degree of transparency of said stone;
   in a zone in which said stone is totally included in said housing, the first frontal degree of transparency is a degree of a means located above said stone along said first surface.

4. The multipurpose card of claim 1, wherein said stone is arranged at least partially within said housing, said multipurpose card comprising walls to:
   totally surround said stone, the walls being spaced with respect to each side of said stone; and
   define at their ends a larger base closer to said second surface and a smaller base on said first surface, wherein said smaller base is smaller than at least one section of said stone parallel to the smaller base and passing inside said housing.

5. The multipurpose card of claim 1, wherein at least one univocal card identification code is
   printed on at least one of said first surface and second surface, and/or
   stored in a data storage device incorporated in said multipurpose card.

6. The multipurpose card of claim 1, wherein said electromagnetic radiation is in the visible spectrum.

7. The multipurpose card of claim 1, wherein:
   the layer extends beyond the second surface up to a third surface arranged at a distance in front of the second surface on a side opposite to the first surface; and
   a volume defined in the layer:
      includes everything located between said one or more first frontal and lateral areas and said one or more second frontal and lateral areas; and
      has a bottom constituted at least by or facing said second surface;
   wherein said multipurpose card is formed in one block or said volume is obtained by fixing a prefabricated element in a recess of said multipurpose card.

8. A method for reading a multipurpose card, wherein the following successive steps are performed:
   A. positioning a multipurpose card in a fixed position with respect to a predetermined spatial reference system,
      the multipurpose card comprising a first surface, a second surface, arranged in front of said first surface, a layer, arranged between said first surface and said second surface, and a stone, at least semi-transparent to an electromagnetic radiation, in a fixed position and at least partially in a housing at least partially in said layer; wherein:
         the first surface comprises:
            one or more first frontal areas with a first frontal degree of transparency to said electromagnetic radiation, either positioned in front of or comprising portions of said stone;

one or more first lateral areas with a first lateral degree of transparency to said electromagnetic radiation, positioned outside said one or more first frontal areas;

wherein said first frontal degree of transparency is greater than said first lateral degree of transparency;

the second surface comprises:
one or more second frontal areas with a second frontal degree of transparency to said electromagnetic radiation, positioned in front of said stone;
one or more second lateral areas with a second lateral degree of transparency to said electromagnetic radiation, positioned outside said one or more second frontal areas;

wherein said second frontal degree of transparency is smaller than said second lateral degree of transparency; and the layer comprises, along a set of electromagnetic paths between said one or more second lateral areas and a surface portion of said housing, interposed means at least semi-transparent to said electromagnetic radiation, configured to allow light to pass into said housing, and wherein at least one univocal card identification is printed on at least one of said first surface and second surface, and/or stored in a data storage device incorporated in said multipurpose card;

B. sending an electromagnetic radiation on said one or more second lateral areas;

C. acquiring at least one image of said stone on the basis of an electromagnetic radiation exiting from said one or more first frontal areas;

D. comparing said at least one image with a set of reference images of said stone associated with respective pre-registered multipurpose cards;

E. determining a degree of similarity between said at least one image and the images of said set of reference images; and F. identifying said multipurpose card in said set of pre-registered multipurpose cards, on the basis of the degree of similarity determined in step E.

9. The method for reading a multipurpose card of claim 8, wherein step F comprises the following substeps:

F1. identifying a reference image in said set of reference images having a maximum degree of similarity with said at least one image, F2. checking whether said maximum degree of similarity is higher than a predetermined threshold value, and in the affirmative case:

F3. identifying said multipurpose card with the pre-registered multipurpose card having a predetermined faceted precious stone the reference image of which has the maximum degree of similarity with said at least one image.

10. A system for reading a multipurpose card, said system comprising:

a receiving device for receiving a multipurpose card, the multipurpose card comprising a first surface, a second surface, arranged in front of said first surface, a layer, arranged between said first surface and said second surface, and a stone, at least semi-transparent to an electromagnetic radiation, in a fixed position and at least partially in a housing at least partially in said layer; wherein:

the first surface comprises:
one or more first frontal areas with a first frontal degree of transparency to said electromagnetic radiation, either positioned in front of or comprising portions of said stone;
one or more first lateral areas with a first lateral degree of transparency to said electromagnetic radiation, positioned outside said one or more first frontal areas;

wherein said first frontal degree of transparency is greater than said first lateral degree of transparency;

the second surface comprises:
one or more second frontal areas with a second frontal degree of transparency to said electromagnetic radiation, positioned in front of said stone;
one or more second lateral areas with a second lateral degree of transparency to said electromagnetic radiation, positioned outside said one or more second frontal areas;

wherein said second frontal degree of transparency is smaller than said second lateral degree of transparency; and the layer comprises, along a set of electromagnetic paths between said one or more second lateral areas and a surface portion of said housing, interposed means at least semi-transparent to said electromagnetic radiation, configured to allow light to pass into said housing, and wherein at least one univocal card identification is printed on at least one of said first surface and second surface, and/or stored in a data storage device incorporated in said multipurpose card;

lighting means configured to irradiate said stone with an electromagnetic radiation, and arranged with respect to said receiving device so that, when said multipurpose card is inserted in said receiving device, said electromagnetic radiation is incident on said one or more second lateral areas;

image acquisition means configured to acquire at least one image of said stone on the basis of an electromagnetic radiation coming from said one or more first frontal areas;

a database storing:
one or more univocal stone identification codes of respective one or more predetermined stones;
at least one reference stone image for each of said respective one or more predetermined stones; and
one or more univocal card identification codes of respective pre-registered multipurpose cards, each associated with at least one of said one or more univocal stone identification codes;

a logic control unit, connected to said receiving device, to said image acquisition means and to said lighting means;

wherein:

the receiving device is configured to:
receive said multipurpose card in a fixed position with respect to said image acquisition means and to said lighting means, and
send a signal to said logic control unit, when said multipurpose card is inserted in said receiving device, and the logic control unit is configured to:
receive said signal from said receiving device,
control the lighting means and the image acquisition means to perform steps B and C of a method for reading a multipurpose card, wherein the following successive steps are performed:

A. positioning a multipurpose card in a fixed position with respect to a predetermined spatial reference system, B. sending an electromagnetic radiation on said one or more second lateral areas;

C. acquiring at least one image of said stone on the basis of an electromagnetic radiation exiting from said one or more first frontal areas;

D. comparing said at least one image with a set of reference images of said stone associated with respective pre-registered multipurpose cards;

E. determining a degree of similarity between said at least one image and the images of said set of reference images; and F. identifying said multipurpose card in said set of pre-registered multipurpose cards, on the basis of the degree of similarity determined in step E; and perform the steps from D to F.

11. The system of claim 10, wherein:

said system further comprises a reader for reading said univocal card identification code of said multipurpose card, the reader being connected to said logic control unit; and said logic control unit is configured to:
    acquire the univocal card identification code of said multipurpose card,
    compare codes between the univocal card identification code of said multipurpose card with one or more card identification codes of respective pre-registered multipurpose cards stored in said database, and
    identify a pre-registered multipurpose card having the univocal card identification code equal to the univocal card identification code of said multipurpose card, wherein image comparison of step D is between said at least one image, acquired by said image acquisition means, and one or more reference images stored in said database and associated with said predetermined multipurpose card having the univocal card identification code equal to the univocal card identification code of said multipurpose card.

12. The system of claim 10, wherein said electromagnetic radiation is in the visible spectrum and the image acquisition means comprise:

an optical sensor or film;

an optical assembly comprising at least one lens assembly, wherein said at least one lens assembly is arranged at a first distance from said optical sensor or film and said optical assembly is arranged so that, when said optical assembly is in use, said optical assembly is at a second distance from said stone, said first distance and said second distance being adjustable;

a diaphragm with an adjustable opening between a first opening value and a second opening value, wherein said second opening value is greater than said first opening value, and wherein:

a field depth of said image acquisition means depends on said first distance from said second distance and on an opening value of said diaphragm, and each reference image is obtained with a predetermined field depth.

13. The system of claim 10, wherein said at least one stone reference image comprises images of predetermined internal parts of said stone, wherein each predetermined internal part is arranged at a respective predetermined height of said one or more predetermined stones along a predetermined axis.

14. The multipurpose card of claim 1, wherein said stone is a faceted precious stone.

15. The multipurpose card of claim 14, wherein said faceted precious stone is a diamond.

* * * * *